United States Patent [19]
Wiley

[11] 3,977,146
[45] Aug. 31, 1976

[54] FASTENER BUSHING

[75] Inventor: Troyce W. Wiley, Costa Mesa, Calif.

[73] Assignee: Standard Pressed Steel Co., Jenkintown, Pa.

[22] Filed: Dec. 18, 1974

[21] Appl. No.: 534,019

[52] U.S. Cl. .................................. 52/617; 52/57; 16/2
[51] Int. Cl.² ........................ E04B 2/28; E04C 2/34
[58] Field of Search ............... 52/617, 57, 758 D; 16/2; 85/37

[56] References Cited
UNITED STATES PATENTS

| | | | |
|---|---|---|---|
| 2,607,447 | 8/1952 | Tuttle | 52/617 |
| 3,008,552 | 11/1961 | Cushman | 52/617 |
| 3,137,887 | 6/1964 | Mannino et al. | 52/617 |
| 3,252,493 | 5/1966 | Smith | 52/617 |
| 3,313,079 | 4/1967 | Phelan | 52/617 |
| 3,349,649 | 10/1967 | Mele | 16/2 |
| 3,384,142 | 5/1968 | Phelan | 52/617 |
| 3,443,473 | 5/1969 | Tritt | 52/617 |
| 3,526,072 | 9/1970 | Campbell | 52/617 |
| 3,680,429 | 8/1972 | Briles | 52/758 D |
| 3,829,184 | 8/1974 | Chevret | 16/2 |

Primary Examiner—Ernest R. Purser
Assistant Examiner—Robert Farber
Attorney, Agent, or Firm—Andrew L. Ney; Aaron Nerenberg

[57] ABSTRACT

A fastener bushing for use in a panel structure consisting of a pair of spaced outer skins and a low density core therebetween is formed with an elongated shank adapted to be inserted through an opening in the panel. The shank has a longitudinal bore extending therethrough in which a fastener element can be inserted and includes an integral enlarged head formed at one end thereof which will overlie the skin along one side of the panel when the bushing is inserted in the openings. The bushing has a peripheral groove formed on the shank immediately below the head so that when the shank is fully inserted in the panel, the groove receives the edge of the opening through which the shank was inserted, thereby to positively retain the fastener bushing in the panel.

22 Claims, 3 Drawing Figures

FASTENER BUSHING

The present invention relates to a fastener bushing, and more particularly to a bushing element for use in panels of lightweight or honeycomb type sandwich construction which will allow the panel to support a fastener by which the panel is connected in structural assemblies or supports other elements to be secured thereto.

In many applications where a lightweight wall or structural member is necessary, such as for example in aircraft frame structures, it is conventional to use panel elements, formed from spaced skins or sheets of a light gauge material, such as aluminum, secured to a relatively fragile core of transversely honeycombed, fluted or pleated material. Such panel arrangements provide maximum strength with a minimum of weight. However, because of the cellular core construction, these panels have limited compressive strength and little shear strength so that it is difficult to mount fastener elements such as bolts or screws in the panels in order to secure the panels in structural assemblies or to mount an object on the panel. In certain applications where a compression nut and bolt assembly is used with these panels, the panels have a tendency to collapse inwardly at the bolt upon overtightening of the nut. In addition with a bolt or other type of fastener, the panels also have a tendency to tear, at the fastener, or the fastener opening may enlarge, under stresses caused by vibrations or the like, so that the panel is weakened and the fastener connection destroyed.

Several fastener arrangements have been proposed for use in such panels in order to overcome these problems. These previously proposed arrangements include the use of a potting material injected or inserted in the honeycomb panel at the area in which the fastener is to be inserted in order to reinforce the panel at that point. Other arrangements include inserts or oversized bushings placed in prebored holes in the panel and adapted to receive a fastener therein. Such devices are shown for example in U.S. Pat. Nos. 2,967,593; 3,137,887; and 3,041,912.

The present invention is an improvement over such previously proposed panel fastening systems and provides a dual function in that it enables a fastener to be readily inserted in a lightweight honeycomb panel, while reinforcing the panel by acting as a rigid spacer between the panel skins. In addition, the construction of the present bushing is such that it is automatically retained in the panel by a positive snap or locking cooperation with one of the panel skins. Furthermore, the construction of the present bushing provides residual stresses in one of the panel skins, whereby the fatigue resistance is improved.

It is an object of the present invention to enable fastening of a lightweight honeycomb panel to other elements by a secure and permanent fastener arrangement.

Another object of the present invention is to provide a fastener system and/or element, which will be securely and relatively rigidly mounted in a lightweight panel automatically, upon insertion.

Still another object of the present invention is to provide a fastener bushing for use in a lightweight panel which is relatively inexpensive to manufacture.

Yet another object of the present invention is to provide a high strength fastener bushing which will also act as a spacer element to reinforce a lightweight panel in which it is used.

A further object of the present invention is to provide a high-strength fastener bushing which overfills the hole in the skin under the head of the bushing which improves the fatigue resistance of the structure.

In accordance with a preferred embodiment of the present invention a fastener bushing is provided which is adapted particularly to be used in a panel construction that consists of a pair of spaced skins having a hollow honeycomb type core material secured there between. The panel has a pre-formed opening extending through the core and skins through which opening a fastener element is to be inserted. The fastener bushing consists of a generally elongated cylindrical shank adapted to be inserted in the panel opening and has an elongated bore formed therein which is adapted to receive a fastener element such as a threaded bolt or the like. The bushing shank has a radially enlarged head integrally formed at one end thereof, which head is adapted to overlie one of the panel skins when the shank is inserted in the opening. The outer diameter of the shank is dimensioned to be slightly greater than the diameter of the panel opening so that upon insertion of the shank, the skin through which it is inserted will be elastically deformed and pressed slightly downwardly into the panel. This deformation of the skin is advantageously utilized in accordance with the present invention by the provision of an annular peripheral groove formed on the shank immediately below the bushing head so that upon full insertion of the shank in the panel this groove will be adjacent the edge of the deformed skin about the panel opening and the skin will snap into the groove. As a result the bushing is positively and automatically retained in the panel opening.

The above, and other objects, features and advantages of the invention will be apparent from the following detailed description of an illustrative embodiment thereof which is to be read in connection with the accompanying drawings, wherein.

Figure 1:
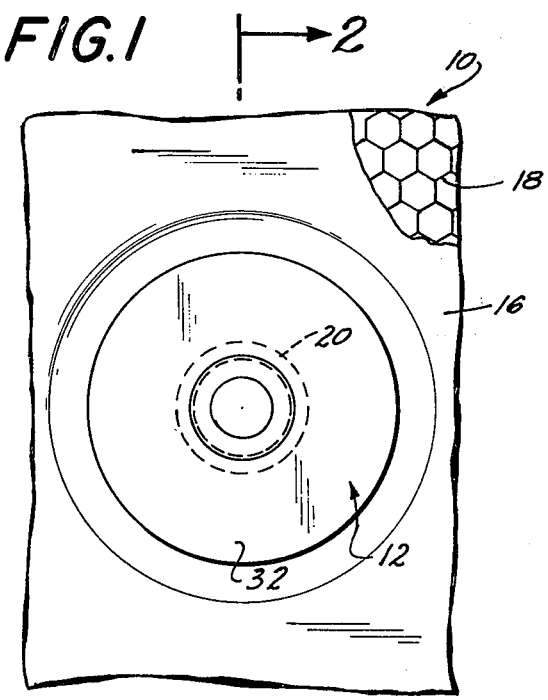
FIG. 1 is a plan view, with parts broken away, of a lightweight panel structure having a fastener bushing constructed in accordance with the present invention mounted in a pre-formed panel opening.
Figure 2:
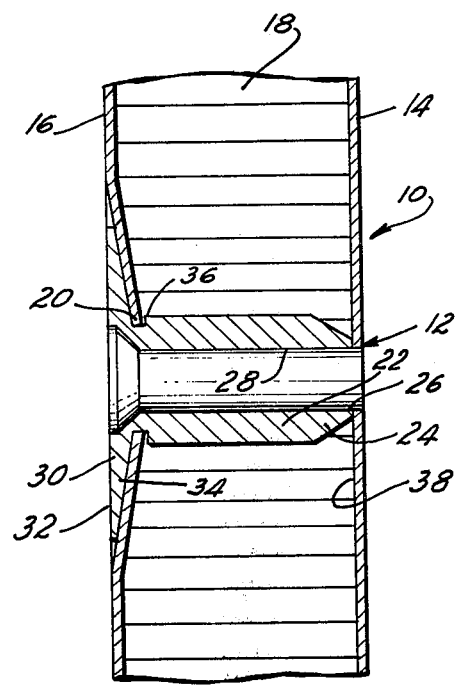
FIG. 2 is a sectional view taken along line 2—2 of FIG. 1.

Referring now to the drawing in detail, and initially to FIGS. 1 and 2 thereof, it will be seen that a conventional lightweight panel 10 has a fastener bushing 12 constructed in accordance with the present invention mounted therein for receiving a fastener element by which the panel 10 can either be secured in a structural assembly or support an object. The panel 10 is a conventional honeycomb structure, such as is used in aircraft frames, and consists of a pair of spaced light gauge metal sheets or skins 14, 16 secured in any convenient manner to an internal honeycombed core 18. The panel is prebored with an elongated opening 20, formed for example by drilling, in which the fastener bushing 12 is inserted.

Bushing 12 consists of an elongated shank 22 formed of a rigid material such as for example high strength steel. The shank has a tapered low end portion 24 which terminates in a flat free end or edge 26 that surrounds an internal longitudinal bore 28 formed in the bushing. The diameter of the bushing shank 22 is selected to be greater than the internal diameter of the opening 20 formed in the panel 10 so that upon insertion of the bushing the skin 16 through which it is inserted will be slightly elastically deformed by the shank. Of course it will be appreciated that the tapered end portion 24 of the shank facilitates both insertion of the bushing through the opening in the panel and elastic deformation of the panel skin.

The opposite end of shank 22 includes an integrally formed head or flange 30 which is radially extended about the bore 28. The flange has a flat upper surface 32 and a tapered generally conically shaped lower surface 34 which overlies and engages the outer surface of skin 16. This tapered flange serves to dimple or recess skin 16 upon insertion of the bushing in the panel so that the top surface 32 of the flange will lie flush with panel skin 16 in the completed assembly. By this arrangement the need to pre-dimple or countersink the panel, as was required by previously proposed fastener arrangements, is avoided while the advantage of having a flush surface on the panel is retained. Preferably it has been found that the taper of the surface 34, i.e., the angle between the surfaces 32 and 34 of the head 30 should be approximately 26°.

The shank 22 also includes a peripheral annular groove 36 which is formed in the shank immediately below head 30, as most clearly seen in FIGS. 2 and 3. By locating groove 36 in this manner it will be apparent that upon complete insertion of the bushing in the panel, as seen in FIG. 2, the groove 36 will be located adjacent the edge of skin 16 which surrounds opening 20. The groove thus provides a relief for the elastically deformed edge portions of the opening (this deformation being formed by the oversize diameter of the shank 22) so that as the groove moves into position adjacent the edges of skin 16 these edges will snap into the groove and positively retain the bushing within the panel. The diameter of groove 36 is such that the elastically deformed edge portion of the opening 20 is not completely relieved thus leaving residual compressive stresses in the material surrounding the opening. Thus, the bushing cannot be inadvertently removed from the panel and improves fatigue resistance of the structure.

In accordance with another feature of the invention the length of shank 22, between the groove 36 and the flat edge 26 thereof, is selected such that upon complete insertion of the bushing in the panel the edge 26 will engage the inner surface 38 of the opposite skin 14. In this manner, the bushing itself acts as a spacer to prevent collapse of the panel skins towards one another upon tightening of a fastener inserted through the bore 28 of the bushing.

Figure 3:
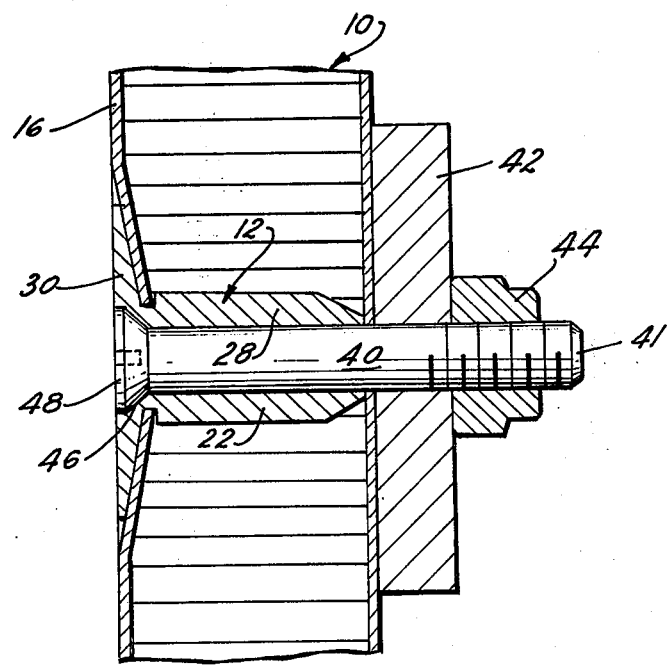
FIG. 3 is a sectional view similar to FIG. 2 and showing a bolt inserted in the fastener bushing for securing an object to the panel.

Referring now to FIG. 3 of the drawing, it is seen that a fastener 40, which may consist of a conventional threaded bolt, is adapted to be inserted through the bore 28 of the bushing 12 so that its end 41 can be inserted through a pre-bored hole in a structural member or other 42 to be mounted thereon. After the member 42 is properly seated against panel 10, a nut 44 can be threaded on the shank of bolt 40 to form a tight connection between the object and the panel. It will be apparent that upon tightening of the nut 44 the compressive stresses will be transmitted through the shank 22 of bushing 12 rather than through the core material, so that the panel 10 retains its integrity. On the other hand, at the opposite side of the panel the enlarged head 30 serves to distribute the stresses along a broad area of the panel.

In order to retain the desired flush surface of the panel on the side 16 thereof the head 30 can have a countersunk recess 46 formed therein coaxial with the bore 28, so as to receive the head 48 of the bolt 40 inserted through the bushing.

Although the bore 28 of the bushing 22, as described above is a smooth bore which extends entirely through the bushing, it is contemplated that the bore can be threaded so as to receive the threaded end of a fastener inserted therein, as for example through the side 14 of the panel. In this case, the bore 28 need not extend entirely through the bushing, so that head 30 can be solid and the bushing then will act as a nut. While the interference of opening 20 by groove 36 provides anti-rotation of the bushing with respect to the panel, the resistance of the bushing to rotation can be further enhanced by incorporating spanner wrenching holes, slots, an irregular cross-section in the groove 36 or the like. Of course, the use of the bushing 12 of the present invention is not limited to use only with threaded fasteners, but other types of fastener arrangements can be secured through the bore of the bushing if desired.

Accordingly, it will be appreciated that the one piece fastener bushing of the present invention provides numerous advantages in fastener systems used with lightweight or honeycomb type panels. The bushing acts simultaneously as a part of the fastener system, while providing a spacer action which prevents collapse of the panel under loads in excess of the natural strength of the panel itself. The bushing is automatically trapped and positively retained in the panel upon insertion, without the need for any additional potting or fastening arrangements to retain the bushing. Moreover, the tapered head construction distributes any tensile, compressive or shear loads in the bushing over a wide bearing surface on the adjacent skin of the panel so that no area of the panel is subjected to concentrated loads. The tapered construction of this head also provides the additional function of automatically dimpling the adjacent panel skin upon insertion of the bushing into the panel in order to provide a flush surface along the panel. The bushing also is easily inserted in the panel due to the tapered construction of the free end thereof, while it is dimensioned so as to resiliently or elastically deform the panel skin 16 to insure the desired snap action of the edges of the panel adjacent the opening into the groove along the shank and still maintain compressive residual stresses in the panel adjacent the opening.

Although an illustrative embodiment of the present invention has been described herein with reference to the accompanying drawings, it is to be understood that the invention is not limited to that precise embodiment, and that various changes and modifications may be effected therein by one skilled in the art without departing from the scope or spirit of this invention.

What is claimed is:

1. A fastener bushing for use in a panel structure consisting of at least one outer skin and a low density core having an opening extending through the core and skin, said fastener bushing comprising a shank adapted to be inserted in said opening; said shank having a longitudinal bore extending therethrough and an enlarged head formed at one end thereof adapted to overlie said outer skin when the shank is inserted in the opening; said shank having a groove formed therein about the periphery thereof before insertion into said opening immediately below said head for receiving the edge portion of the outer skin about said opening when said shank is inserted therein, thereby to positively retain the fastener bushing in the panel.

2. A fastener bushing as defined in claim 1 wherein said shank is generally cylindrical and has a diameter which is larger than the diameter of said opening thereby to resiliently deform the edge of the opening upon insertion of the shank therein wherey the edge of the opening will snap into said groove to positively retain the bushing in the opening.

3. A fastener bushing as defined in claim 2 wherein said enlarged head has a flat upper surface and a lower radially extending surface, said lower surface being generally conical in shape to form a dimple in said outer skin upon insertion of the shank in said panel whereby upon full insertion of the fastener bushing in said panel, the flat upper surface of said enlarged head lies substantially flush with said outer skin.

4. A fastener bushing as defined in claim 3 wherein said shank has a lower end portion which is tapered inwardly to facilitate insertion of the shank in the opening.

5. A fastener bushing as defined in claim 3 wherein said bore extends through the upper surface of said head and said head has a countersunk recess formed in said upper surface coaxial with said bore for receiving the head of a fastener element flush within the head.

6. A fastener bushing as defined in claim 3 wherein the bore of said shank is internally threaded to receive a threaded fastener.

7. A fastener bushing for use in a panel structure comprising a pair of spaced skins having a core material therebetween and an elongated opening extending through the core and skins; said fastener bushing comprising an elongated generally cylindrical shank adapted to be inserted in said opening and having upper and lower end portions; a radially enlarged head integrally formed at said upper end portion of the shank and adapted to overlie one of said skins when the shank is inserted in said opening; said shank having an internal bore formed therein, an outer diameter which is larger than the diameter of said opening thereby to elastically deform the skin through which its lower end portion is inserted, and an annular peripheral groove formed therein before insertion into said opening immediately below said head having a diameter which is larger than the diameter of said opening for receiving the edges of the elastically deformed skin about said opening in intimate contact therewith, whereby the edges will snap into said groove when the bushing is fully inserted in the panel to positively retain the bushing in said opening and whereby residual compressive stresses are developed in said deformed skin surrounding said opening.

8. A fastener bushing as defined in claim 7 wherein said lower end portion of the shank has a free end and is tapered inwardly toward said free end to facilitate insertion of the shank in the opening.

9. A fastener bushing as defined in claim 8 wherein said free end is flat and said shank is dimensioned to have a length between said groove and said free end which is substantially equal to the spacing between said skins whereby, upon insertion of the shank in said opening through one of said skins, said flat free end will engage the other one of said skins to maintain the spacing therebetween and reinforce the panel at the opening.

10. A fastener bushing as defined in claim 10 wherein said bore extends through the upper surface of said head and said head has a countersunk recess formed in said upper surface coaxial with said bore for receiving the head of a fastener element flush with the head.

11. A fastener bushing as defined in claim 10 wherein the bore of said shank is internally threaded to receive a threaded fastener.

12. A honeycomb panel assembly comprising:
   a honeycomb panel having first and second spaced skins and a core arrangement disposed between said spaced skins, said honeycomb panel having a hole extending from said first skin to said second skin with said material in said first skin surrounding said hole dimpled inwardly into said core arrangement;
   and a fastener bushing having an elongated shank extending through said hole and an enlarged head at one end of said shank overlying said dimpled surface of said first skin, said shank having an outer diameter which is larger than the diameter of said hole and a peripheral groove formed therein before insertion into said hole below said head within which said first skin is retained.

13. A honeycomb panel assembly as defined in claim 12 wherein said groove has a diameter which is larger than the diameter of said hole and wherein the edge of said hole in said first skin and the surface of said groove are in such intimate contact that residual compressive stresses are developed in said first skin surrounding said hole.

14. A honeycomb panel assembly as defined in claim 12 wherein the end of said bushing opposite from said head bears against said second skin around said hole.

15. A honeycomb panel assembly as defined in claim 12 wherein said enlarged head has a flat upper surface and a lower radially extending surface, said lower surface being generally conical in shape to form said dimple in said first skin upon insertion of said shank in said honeycomb panel, said flat upper surface being substantially flush with said first skin surface.

16. A honeycomb panel assembly as defined in claim 12 wherein said shank has a longitudinal bore extending therethrough and said head has a countersunk recess formed in said upper surface coaxial with said bore for receiving the head of a fastener element flush within the head.

17. A honeycomb panel assembly as defined in claim 16 wherein the bore of said shank internally threaded to receive a threaded fastener.

18. A honeycomb panel assembly as defined in claim 12 wherein said fastener bushing is a single member.

19. A fastener bushing as defined in claim 1 wherein said groove has a diameter which is larger than the diameter of said opening and is constructed to be in intimate contact with the edge portion of the outer skin about said opening thereby to develop residual compressive stresses in said edge portion.

20. A fastener bushing as defined in claim 1 wherein said fastener bushing is a single member.

21. A fastener bushing as defined in claim 9 wherein said enlarged head has a flat upper surface and a lower radially extending surface, said lower surface being generally conical in shape to form a dimple in said one of said skins upon insertion of the shank in said panel whereby upon full insertion of the fastener bushing in said panel the flat upper surface of said enlarged head lies substantially flush with said one skin surface.

22. A fastener bushing as defined in claim 7 wherein said fastener bushing is a single member.

* * * * *